United States Patent [19]
Fujita et al.

[11] Patent Number: 5,352,394
[45] Date of Patent: Oct. 4, 1994

[54] INJECTION MOLDING METHOD AND APPARATUS WITH MAGNETIC MOLD CLAMPING

[75] Inventors: Jun Fujita; Yoshinori Nakanishi, both of Numazu; Shinichi Tazawa; Hideo Tanaka, both of Mishima; Masao Hirosawa, Shizuoka; Nobukatsu Omura; Harukatsu Goto, both of Numazu, all of Japan

[73] Assignee: Toshiba Kikai Kabushiki Kaisha, Tokyo, Japan

[21] Appl. No.: 916,081

[22] PCT Filed: Apr. 30, 1991

[86] PCT No.: PCT/JP91/00586
§ 371 Date: Jul. 29, 1992
§ 102(e) Date: Jul. 29, 1992

[87] PCT Pub. No.: WO92/09416
PCT Pub. Date: Jun. 11, 1992

[30] Foreign Application Priority Data
Nov. 30, 1990 [JP] Japan ................. 2-334814
Nov. 30, 1990 [JP] Japan ................. 2-334815

[51] Int. Cl.$^5$ ............... B29C 45/64; B29C 45/76
[52] U.S. Cl. .................. 264/40.5; 264/328.1; 264/328.7; 425/3; 425/149; 425/150; 425/185; 425/589; 425/590
[58] Field of Search .......... 264/40.5, 328.1, 328.7, 264/328.9; 425/3, 149, 150, 190, 192 R, 195, 574, 575, 576, 589, 590, 595, 450.1, 451.2, 451.7, 451.9, 185

[56] References Cited

U.S. PATENT DOCUMENTS

| | | | |
|---|---|---|---|
| 3,604,058 | 9/1971 | Fischbach | 425/150 |
| 3,909,169 | 9/1975 | Barrie | 425/150 |
| 4,589,830 | 5/1986 | Clawson | 425/150 |
| 4,715,804 | 12/1987 | Takahashi | 425/150 |
| 4,861,254 | 8/1989 | Takeuchi et al. | 425/595 |
| 4,867,924 | 9/1989 | Schilkey et al. | 425/405.1 |
| 4,968,239 | 11/1990 | Inaba et al. | 425/451.7 |
| 5,110,283 | 5/1992 | Blüml et al. | 425/451.7 |

FOREIGN PATENT DOCUMENTS

| | | |
|---|---|---|
| 3715161A | 11/1987 | Fed. Rep. of Germany . |
| 1332027 | 6/1963 | France . |
| 59-62128A | 4/1984 | Japan . |
| 61-154823A | 7/1986 | Japan . |

OTHER PUBLICATIONS

Prof. Dr.-Ing. G. Menges, et al "New Method for Measuring the Clamping and Locking Force of Injection Moulding Machines", IPE Industrial & Production Engineering, No. 1, 1980, Munich, DE pp. 24 and 26.

*Primary Examiner*—Jill L. Heitbrink
*Attorney, Agent, or Firm*—Stevens, Davis, Miller & Mosher

[57] ABSTRACT

A mold clamping device in an injection molding machine comprises a first platen for retaining a first mold therein and a second platen for retaining a second mold therein; a platen feeding mechanism for moving said first and second platens relative to each other on said table; electromagnetic coils arranged on the opposite surfaces of the first and second platens; and a control device for controlling the amount of the current supplied to the electromagnetic coils. The mold clamping operation is carried out using the magnetic attracting force generated by the electromagnetic coils.

17 Claims, 14 Drawing Sheets

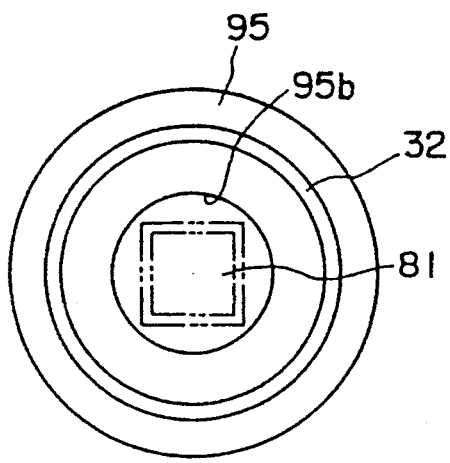
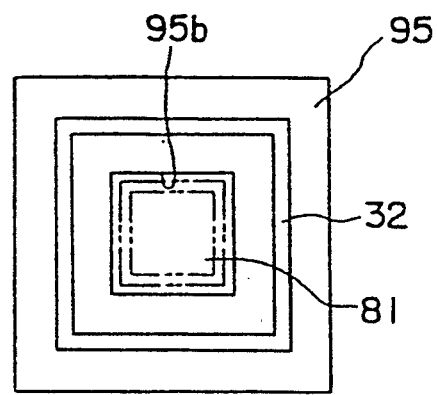
FIG. 21(A)   FIG. 21(B)
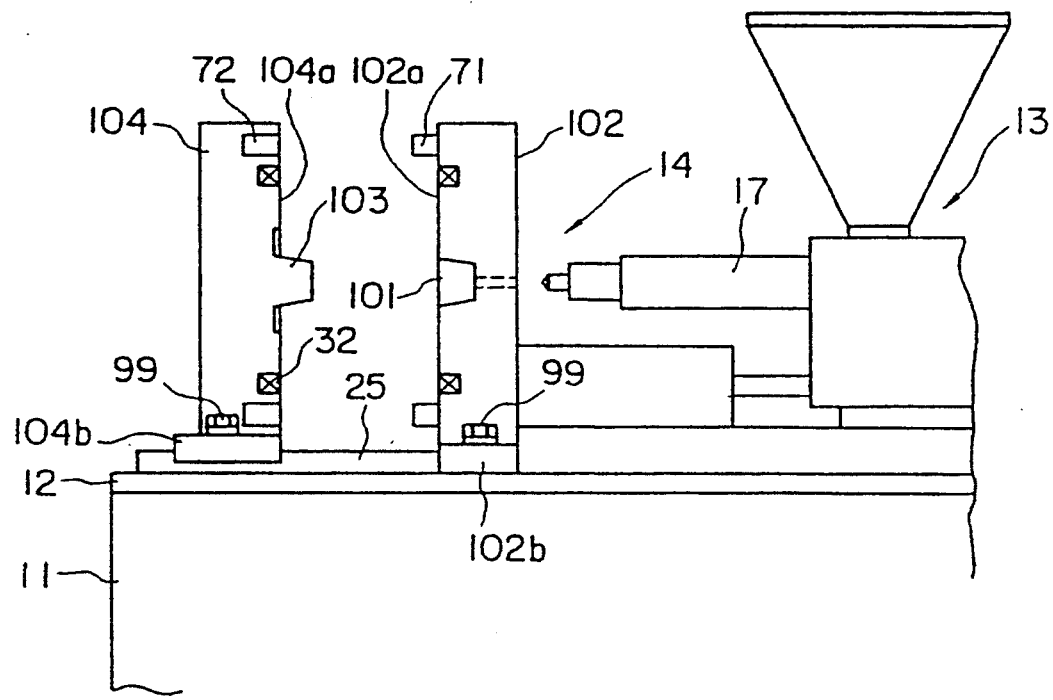
FIG. 22

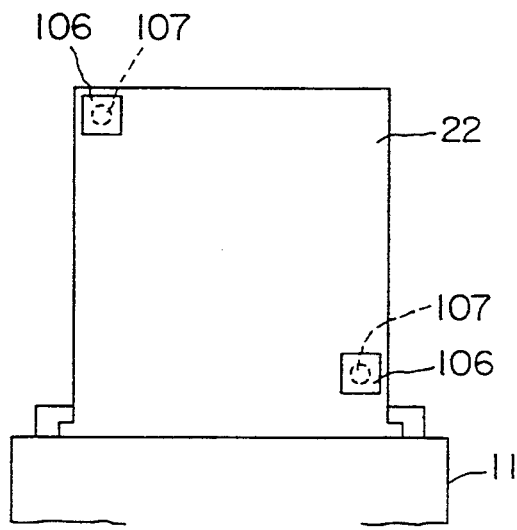
F I G. 24
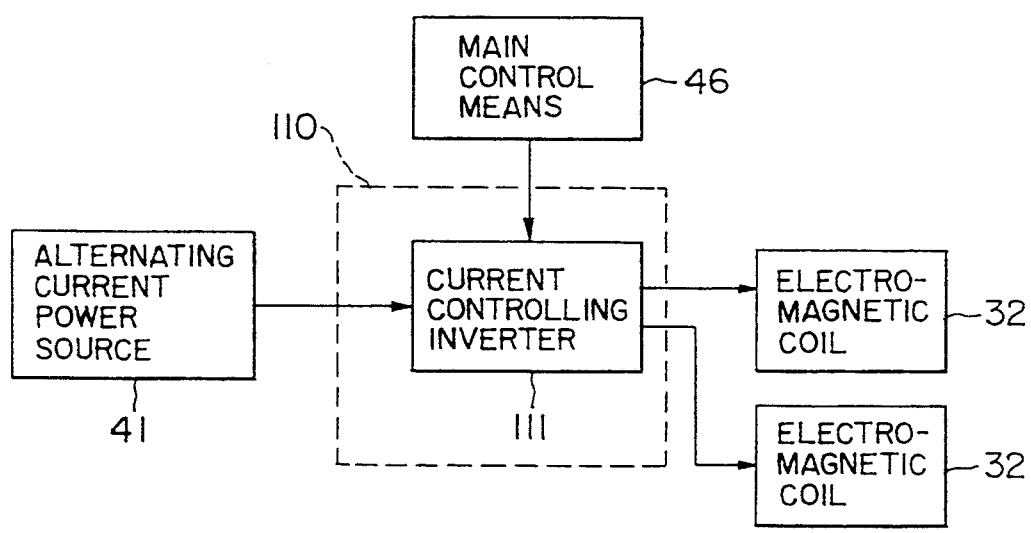
F I G. 25

INJECTION MOLDING METHOD AND APPARATUS WITH MAGNETIC MOLD CLAMPING

TECHNICAL FIELD

The present invention relates to a mold clamping device for clamping a pair of metal molds in an injection molding machine, a die casting machine or the like.

BACKGROUND ART

In an injection molding machine, a die casting machine or the like, a pair of molds therein must be kept in a closed state when a molding product is being molded. In order to maintain the molds in the closed state, against a greater inner pressure produced within the molds, a mold clamping operation is necessary to press the pair of molds towards each other by strong forces from the opposite sides. For this reason, in a molding device in an injection molding machine or the like, a molds clamping device, for maintaining the molds in the closed state during the molding operation, is provided together with an injection device for injecting a raw molding material in a molten state.

These conventional known mold clamping devices include a direct pressure type mold clamping device having a hydraulic driving type mold clamping piston-cylinder mechanism by means of which a pair of molds are directly pressed, and a toggle type mold clamping device having a toggle mechanism by means of which a mold clamping force is retained. In these mold clamping devices, platens are provided to retain the number of the molds necessary for forming a cavity in which a molding product is formed, one of these platens being used as a stationary platen, and the other being used as a movable platen which is moved towards the stationary platen.

When clamping the molds, a greater pressing force is applied to the molds between the movable platen and the stationary platen by pressing the mold clamping piston constituting the mold clamping piston-cylinder mechanism directly or through the toggle mechanism against the back side of the movable platen.

In this case, in the conventional device, the stationary platen and the clamping cylinder constituting the mold clamping piston-cylinder mechanism are connected by a plurality of bars (usually four) parallel to each other, and these tie bars are used as a guide to move the movable platen.

These tie bars are arranged in positions so as to enclose the molds as a center and serve as a sliding guide for the movable platen. Furthermore, they have a function of forming a closed loop between the stationary platen and the clamping cylinder to retain interiorly the mold clamping force. This makes the tie bars indispensable elements for the mold clamping device using the conventional hydraulic driving type clamping piston-cylinder mechanism.

However, since the tie bars are made of costly special alloy steel to maintain the strength thereof, they bring about an increased cost in the clamping device and also an increased number of parts for the mold clamping device.

Furthermore, the existence of the tie bars in the outer periphery of the molds causes some interference with the tie bars in the exchanging operation of the molds, which results in reduced efficiency of operation. For this reason, an attempt was made to axially move one of the four tie bars to thereby facilitate the exchange of the molds (for example, refer to Utility Model Publication No.23656/1975 and Utility Model Publication No. 27966/1990); however such a method requires the special provision of a transfer mechanism for the tie bars, which makes the construction of the mold clamping device more complicated.

In addition, the provision of the hydraulic driving type cylinder-piston mechanism at the rear side of the movable platen makes the mold clamping device longer in the axial direction, which causes the longer longitudinal dimension of an injection molding machine, a die casting machine or the like. This, in turn, makes it necessary to provide a greater work space when the injection molding machine is installed in a factory, and therefore has a disadvantage in that the efficiency of the factory layout is decreased.

Moreover, the hydraulic driving type piston-cylinder mechanism is problematic in that it requires some countermeasures for preventing the deterioration of the work environment due to leakage of oil or oil catching on fire.

This invention has been made taking such points into consideration, and aims at providing a mold clamping device which enables the number of parts to be reduced and a smaller sized device to be produced.

A further object of the invention is to provide a mold clamping device which permits the exchanging operation of the molds to be easily carried out due to the fact that the tie bars are made unnecessary.

Another object of the invention is to provide a mold clamping device which permits the maintenance and control the device to be facilitated due to the fact that the hydraulic driving system is removed.

A further object of the invention is to provide a mold clamping device which enables the control of the mold clamping operation to be facilitated and the most suitable clamping operation to always be carried out.

DISCLOSURE OF THE INVENTION

A mold clamping device in an injection molding machine according to the invention comprises a first platen for retaining a first mold therein and a second platen for retaining a second mold therein, said platens being arranged on a table on which an injection device is mounted; a platen feeding means for moving the first and second platens relative to each other on the table; a magnetic attracting force generating means arranged on at least one side of the first and second platens; and a magnetic attracting force controlling means for controlling a magnetic attracting force of said magnetic attracting force generating means, Moreover, a method for clamping a pair of molds in an injection molding machine according to the invention comprises the steps of:

(a) providing a magnetic absorbing force generating means in at least one of the first and second platens, said first platen having a first mold retained therein and said second platen having a second mold retained therein;

(b) moving both of the platens relatively towards each other to bring them close enough so that the first and second platens become closed;

(c) generating a magnetic attracting force between the first and second platens by a magnetic attracting force generating means to thereby retain both of the platens in a close condition and produce a predetermined mold clamping force;

(d) injecting molten raw material into the cavity within the molds;

(e) releasing the magnetic attracting force between the two platens; and (f) moving both of the platens relatively away from each other to thereby open the first and second molds.

BRIEF DESCRIPTION OF DRAWINGS

FIGS. 21(A) and (B) is a view as perceived in the direction of line F—F in FIG. 20;

FIG. 22 is a side sectional view illustrating a seventh embodiment of the invention;

FIG. 24 is a view as perceived in the direction of line G—G of FIG. 23; and

FIG. 25 is a block diagram showing a modified example of an electromagnetic coil controlling means.

BEST MODE FOR CARRYING OUT THE INVENTION

An embodiment of the invention is explained with reference to the drawings.

Figure 1:
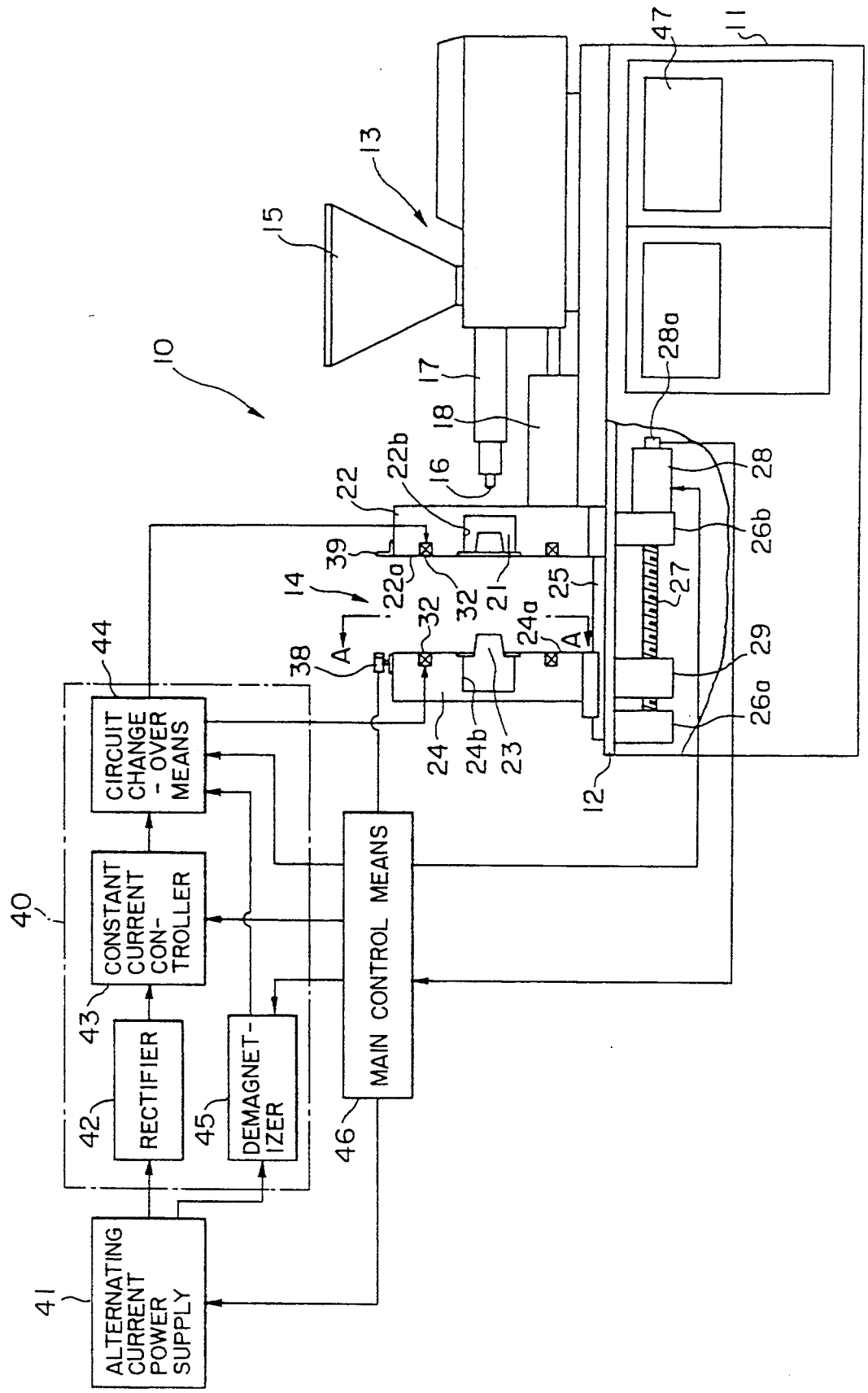
FIG. 1 is a side sectional view illustrating a first embodiment of the invention.

FIG. 1 shows an injection molding machine to which a first embodiment of the invention is applied. The injection molding machine 10 has a box-like frame 11 on which a table 12 is provided horizontally, and is constituted by an injection device 13 and a mold clamping device 14 mounted on the table 12.

The injection device 13 is a device for injecting molten raw material into a pair of molds, and comprises a hopper 15 for supplying the raw material and a barrel 17 which includes a screw therein and by means of which the molten raw material is fed to a nozzle 16 provided at the front end thereof. The injection device 13 is constituted so as to be moved on the table 12 toward the molds by a nozzle touch cylinder 18 mounted on the back side of a first platen 22.

The mold clamping device 14 comprises the first platen 22 in which a first mold 21 is retained, and a second platen 24 in which a second mold 23 is retained. The first and second platens 22 and 24 have opposite flat surfaces 22a and 24a, which have spaces substantially at their centers for mounting the molds, respectively. The first and second molds 21, 23 of cassette types constructed removably are mounted in the respective spaces 22b, 24b for mounting the molds.

A pair of guide bars 25 are arranged parallel to each other on the table 12. The first platen 22 is fixedly arranged at the ends of the guide bars 25 directed to the injection device 13, while the second platen 24 is horizontally and slidably arranged on the guide bars 25. The first platen 22 and the second platen 24 are hereinafter referred to as stationary platen and movable platen, respectively.

A pair of bearing members 26a, 26b are fixedly arranged on the lower surface of the table 12 at a predetermined distance from each other, and a feeding screw 27 is rotatably supported on the bearing members 26a, 26b. A driving motor 28 such as an electric motor is connected to one end of the feeding screw 27. A nut member 29 is threadably engaged with the feeding screw 27, which is connected to the movable platen 24.

Figure 2:
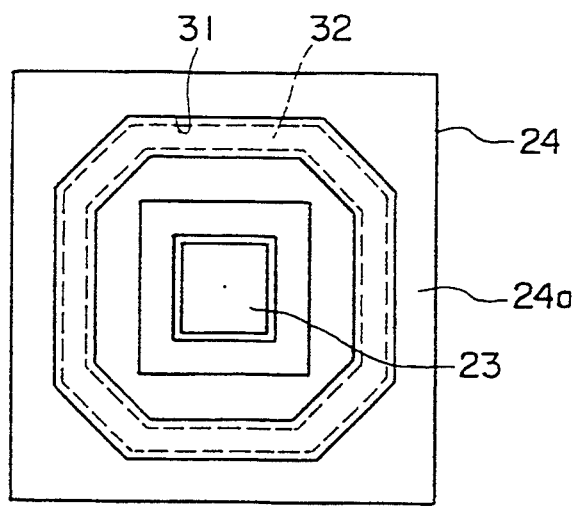
FIG. 2 is a view as perceived in the direction of line A—A in FIG. 1.

As shown in FIG. 2, the movable platen 24 is provided on the opposite surface 24a with an annular groove 31 so as to entirely enclose the outer periphery of the second mold 23, and an electromagnetic coil 32 which generates a magnetic attracting force is disposed within the annular groove 31.

Figure 3:
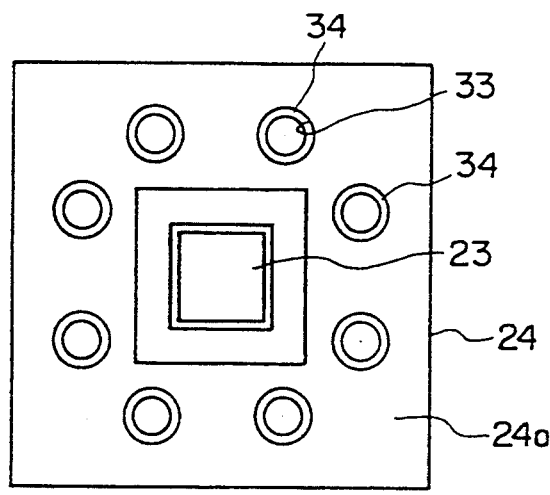
FIG. 3 is a modified embodiment of the mounting side of an electromagnetic coil shown in FIG. 2.

Preferably, the electromagnetic coil is disposed so that it encloses the periphery of the mold provided at the center to make a mold clamping force uniform. As a method for its arrangement, in addition to the method for arranging the electromagnetic coil in a continuous annular form as shown in FIG. 2, there is another method as shown in FIG. 3 in which the electromagnetic coil is constituted by a combination of a plurality of smaller sized electromagnetic coils 34, said smaller sized electromagnetic coils being dispersedly arranged on the opposite surface 24a (22a) of the movable platen 24 (stationary platen 22) within a plurality of circular grooves 33 formed therein at certain intervals so as to enclose the periphery of the mold 23 (21).

Figure 4:
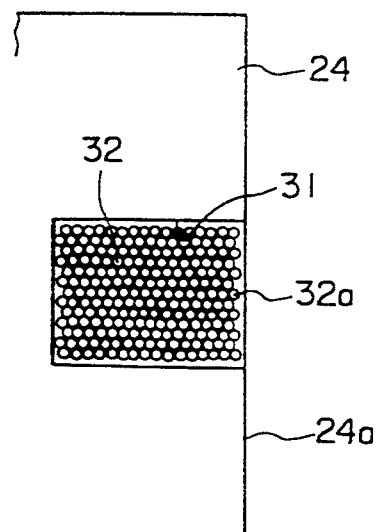
FIG. 4 is a fragmentary enlarged sectional view showing the mounting construction of the electromagnetic coil.

FIG. 4 is a fragmentary enlarged sectional view illustrating an arrangement of the electromagnetic coil 32. The electromagnetic coil 32 is disposed in a continuously wound state within the annular groove 31. The electromagnetic coil is housed so that the outermost surface side 32a thereof is slightly withdrawn into the annular groove 31 from the opposite surface 24a of the movable platen 24, and the entire coil is fixed in the annular groove 31 by solidifying a synthetic resin or the like therein.

This is also applied to a plurality of smaller sized electromagnetic coils 34 as well as the one electromagnetic coil 32 in each platen.

Figure 5A:
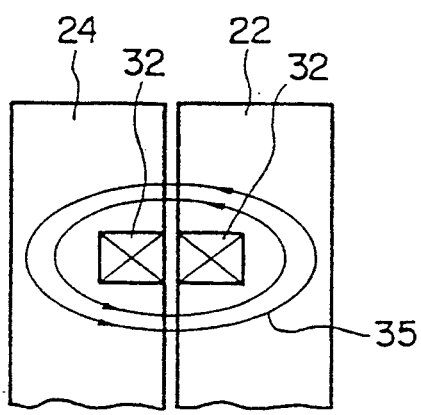
FIGS. 5(A) and (B) are explanation views illustrating examples of the mounting of the electromagnetic coils and the states where magnetic fluxes are formed.

FIG. 5 is a fragmentary sectional view showing examples of different methods for arranging the electromagnetic coil 32. In FIG. 5(A), each electromagnetic coil 32 is disposed in both of the stationary and movable platens 22 and 24, as stated above. This method for arrangement thereof produces lines of magnetic force 35 (magnetic flux) formed so as to enclose the respective electromagnetic coils 32 as shown in the drawing, thereby providing a strong magnetic attracting force.

Figure 5B:
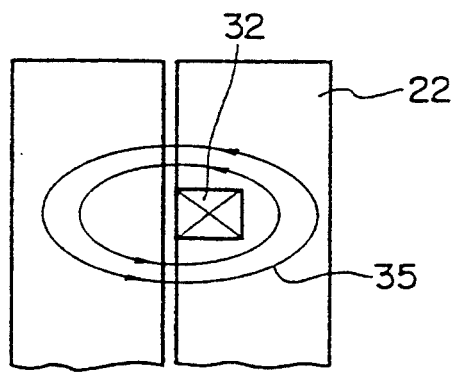

FIG. 5(B) shows an example where the electromagnetic coil 32 is arranged only in one of the platens, for example the stationary platen 22. In this case, the construction thereof is simple in production and electric wiring.

Figure 6:
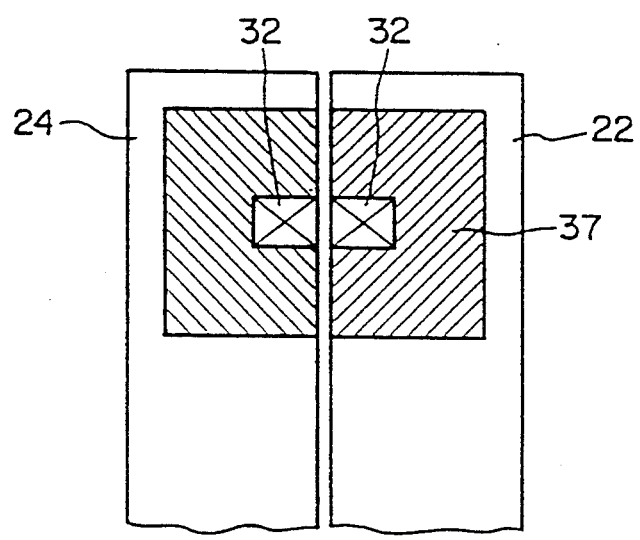
FIG. 6 is a fragmentary enlarged sectional view illustrating an example of the mounting of an electro-magnetic coil.

FIG. 6 is a fragmentary sectional view showing a method for making a magnetic attracting force stronger due to the electromagnetic coil. In this embodiment, channel members 37 made of a material greater in the maximum magnetic density, for example pure iron, are disposed around the electromagnetic coils 32 arranged in the stationary platen 22 and the movable platen 24.

The arrangement of such members 37 enables the maximum magnetic flux density of the lines of magnetic force to be increased as compared with the method of the arrangement shown in FIG. 5(A), so that the magnetic attracting force may be enhanced.

The electromagnetic coil 32 is connected through an electromagnetic coil controlling means 40 (FIG. 1) to an alternating current power supply 41. The electromagnetic coil controlling means 40 comprises an electrical rectifier 42, a constant current controller 43 and a circuit change-over means 44 which is connected to the electromagnetic coil 32. Moreover, a demagnetizer 45 is connected to the circuit change-over means 44 to extinguish any magnetic attracting force due to a residual magnetic flux.

The electromagnetic coil controlling means 40 is connected to a main control means 46 for controlling the operation of the injection molding machine 10. The main control means 46 controls the operation of the injection device 13 and is connected to a driving motor 28 to control the operation of the platen feeding means. In this embodiment, the driving motor 28 is provided with a position detector 28a, which issues a signal to detect the position of movement of a nut member 29 threadably engaged with a feeding screw 27, that is, that of the movable platen 24, so that the operation of the platen feeding means may be controlled. The position detector may be provided between the stationary platen 22 and the movable platen 24 with a combination of a position detecting scale at one side and a detecting head at the other side.

In this embodiment, the movable platen 24 is provided with a gap sensor 38 and a sensor plate 39 is provided on a stationary platen 22 opposite the gap sensor 38. The detection of a gap between both of the platens 22 and 24 can be carried out in such a manner that a signal wave given from the gap sensor 38 is reflected by the sensor plate 39 and the reflected signal wave is detected again by the gap sensor 38. The gap sensor 38 is connected to the main control means 46 to perform a calculation of the gap between both of the platens based on the detecting signal.

The main control means 46 and the electromagnetic coil control means 40 are arranged on a control means arranging section 47 provided on the frame 11 of the machine.

Now, the operation of the embodiment of the device constituted as mentioned above will be explained.

The desired molds 21 and 23 are mounted in the stationary and movable platens, respectively. When the driving motor 28 receives a command for starting a clamping operation from the main control means 46, it is driven and the feeding screw 27 is rotated. The rotation of the feeding screw 27 causes the nut member 29 threadably engaged therewith to move in the axial direction. Thus, the movable platen 24 connected to the nut member 29 is slid on the guide bar 25 towards the stationary platen 22.

When the movable platen 24 is moved a predetermined distance, the rotation of the driving motor 28 is stopped by a signal from the position detector 28a attached to the driving motor 28. At this time, the first and second molds become closed under a low pressure. The distance between the opposite surfaces 22a and 24a of the stationary and movable platens 22 and 24 also reaches a distance which allows a predetermined magnetic attracting force to be actuated. This distance can be determined by controlling the feeding operation of the platen using the gap sensor 38.

Subsequently, a mold clamping operation with the electromagnetic coils 32 is carried out as follows:

When the main control means 46 gives a command for supplying current to the electromagnetic coils 32, the current from the alternating current power supply 41 is rectified to be converted into a direct current voltage source and is supplied to the constant current controller 43. The main control means 46 calculates the magnetic attracting force to be generated based on a preset mold clamping force and a value of current required thereto. A signal of the calculated required current value is sent from the main control means 46 to the constant current controller 43, where the current value to be supplied is controlled.

When the circuit change-over means 44 is actuated by the signal from the main control means 46 to thereby connect the constant current controller 43 and the respective electromagnetic coils 32 arranged in both of the platens 22, 24, a predetermined current is supplied to the electromagnetic coils 32 to thereby generate a magnetic attracting force.

The magnetic attraction force, which is controlled by controlling the value of supplied current as stated above, strongly attracts the platens 22, 24 towards each other so that the first and second molds 21, 23 may be clamped by predetermined clamping force.

In this case, if the signal from the gap sensor 38 shows that the distance between both of the platens is greater than a predetermined value, the desired clamping force is ensured by increasing the value of current. In the case where the electromagnetic coils are arranged in dispersed relation as shown in FIG. 3, the amounts of the currents supplied to the respective electromagnetic coils are controlled separately so that the clamping force of the entire mold may be made uniform.

When the clamping operation is completed, the nozzle touch cylinder 18 is actuated to thereby draw the injection device 13 towards the stationary platen 22 until the nozzle 16 is brought into an abutting engagement with the inlet of the cavity of the mold. Subsequently, the molds are filled with a molten raw material such as a molten resin by a screw (not shown) within the barrel 17.

After the operation of injection molding is finished, an operation for opening the molds is started. First, the circuit change-over means 44 is actuated to thereby stop the supply of current to the electromagnetic coils 32 so that the magnetic attracting force is deenergized. Furthermore, an alternating current is sent to the demagnetizer 45 based on a signal from the main control means 46, and a demagnetizing current sufficient to extinguish the magnetic attracting force which is caused by the residual magnetic flux in the pole of the electromagnet is supplied through the circuit change-over means 44 to the respective electromagnetic coils 32.

Next, the driving motor 28 is driven to rotate the feeding screw 27, so that the nut member 29 and the movable platen 24 connected thereto are slidden on the guide bars 25 in the direction away from the stationary platen 22 to thereby open the molds 21, 23.

The mold clamping device according to the invention fundamentarily performs the operation as stated above, but the following more complicated mold clamping operation can be performed by the control of the value of supplied current.

First, the driving motor 28 is driven to move both of the platens 22, 24 relatively towards each other to thereby close both of the molds 21, 23. Subsequently, the main control means 46 calculates a magnetic attracting force which produces a mold clamping force smaller than that required to oppose an injection pressure, and a current of a value which is able to generate the above-mentioned magnetic attracting force is supplied to the electromagnetic coil 32. Thus, the molds 21, 23 become clamped by a mold clamping force (under a middle pressure) lower than that required.

In this state, when a molten raw material is injected into the molds, the abutting surfaces of both of the molds 21, 23 are slightly moved away from each other.

After a minute gap is produced between both of the molds 21, 23 in this way, the value of current supplied to the electromagnetic coils 32 is increased. Such an increase in the value of the current causes the magnetic attracting force to be increased, thereby producing the mold clamping force greater than the injection pressure.

Both of the molds 21, 23 are compressed again and clamped by the greater mold clamping force.

The fact that once the molds are slightly moved away from each other and then clamped again enables the inner stress of an injection molded product to be removed, thereby making the injection molded product compact.

Furthermore, the compression operation after injection as stated above can be carried out with a higher accuracy if the amount of gap between the molds when moved away from each other by the injection pressure is detected by the gap sensor 38, and when the amount of the gap reaches a predetermined value, the value of the current supplied to the electromagnetic coils 32 is increased.

Moreover, if after completion of the mold clamping operation, the supply of current to the driving motor 28 is stopped and the feeding screw is free to rotate, a possible minute movement of the movable platen 24 causes the feeding screw 27 to be rotated, thereby removing any force in the axial direction applied to the feeding screw 27. Thus, the feeding screw 27 can be prevented from being damaged.

Figure 7:
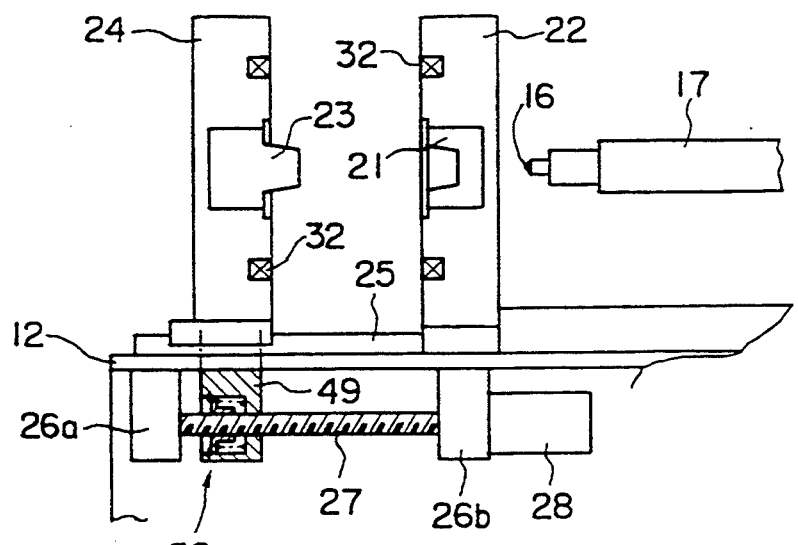
FIG. 7 is a side sectional view showing a second embodiment of the invention.
Figure 8:
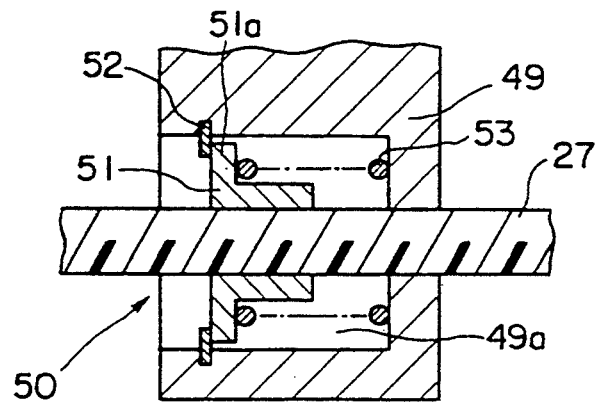
FIG. 8 is a fragmentary enlarged sectional view of a shock absorbing mechanism shown in FIG. 7.
Figure 9:
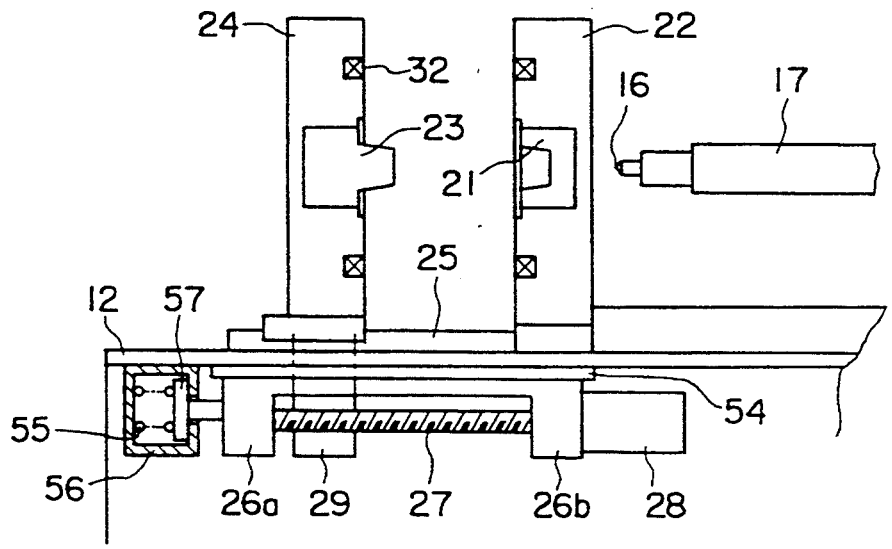
FIG. 9 is a modified example of the embodiment shown in FIG. 7.

FIGS. 7 to 9 are sectional views of a second embodiment of a device according to the invention and illustrate each a platen feeding means provided with a shock absorbing means 50 which may be displaced in the axial direction of the feeding screw. Since the construction of the parts other than the shock absorbing means is the same as those of the afore-mentioned embodiment, the explanation thereof is omitted with the same reference numerals affixed to the same parts.

In the embodiment shown in FIG. 7, the movable platen 24 is connected to a feeding screw 27 through a shock absorbing means 50 incorporated into a nut member 49. As shown in FIG. 8 in detail, the nut member 49 connected to the movable platen 24 is provided with a recess 49a through which the feeding screw 27 extends and in which a flanged nut 51 is disposed in threadably engaged relation with the feeding screw 27. The outside of the flange 51a of the flanged nut 51 is brought into an abutting engagement with a stopper member 52, and a spring 53 is provided between the inside of the flange 51a and the inside face forming the space 49a.

With this embodiment, if a greater force directed backwards is applied to the movable platen 24, the spring is compressed to thereby prevent any excessive axial force from being applied to the flanged nut 51, so that any damage to the feeding screw 27 may be prevented. That is to say, when a raw material is injected into the molds after completion of the mold clamping operation, the injection pressure, if the mold clamping force is insufficient, causes the molds to be opened and the movable platen 24 to be moved back. In this case, the spring 53 absorbs any axial displacement of the nut member 49 to thereby prevent any damage to the flanged nut 51 and the feeding screw 27. This construction provides an advantageous effect of preventing any damage to the feeding screw 27 in carrying out the mold clamping method as stated in the above embodiment in which the mold clamping force is set to a degree of middle pressure and a minute gap is produced between both of the molds at the time of an injection molding operation.

In an embodiment shown in FIG. 9, two bearing members 26a, 26b connected with each other, are slidably mounted on a slide member 54 provided parallel to the guide bar 25 in the lower surface of the table 12 and the entire platen feeding means is made slidable in the same direction as that of the movable platen 24. The table 12 is provided at the lower surface thereof with a spring box 56 fixed thereon and having a spring 55 housed therein, and a flange 57 which is in an abutting engagement with the spring 55 is disposed within the spring box 56 for movement in the same direction as that of sliding movement of the movable platen 24. The face of the flange 57 opposite to the face which is in an abutting engagement with the spring 55 is connected to one 26a of the bearing members.

In this embodiment, if a greater force is applied to the movable platen 24 during the injection molding operation to thereby act an axial force on the nut member 29 and the feeding screw 27, the bearing members 26a, 26b are slidden along the slide member 54 together with the feeding screw 27 while compressing and displacing the spring 55 by the flange 57. Thus, the application of any excessive force to the nut member 29 and the feeding screw 27 is prevented so that any damage to the thread may be prevented.

In the embodiments stated above, the springs are used as shock absorbing means mounted in the platen feeding means, however it is also possible to use hydraulic shock absorbing means or resilient means other than springs (for example, rubber members).

Figure 10:
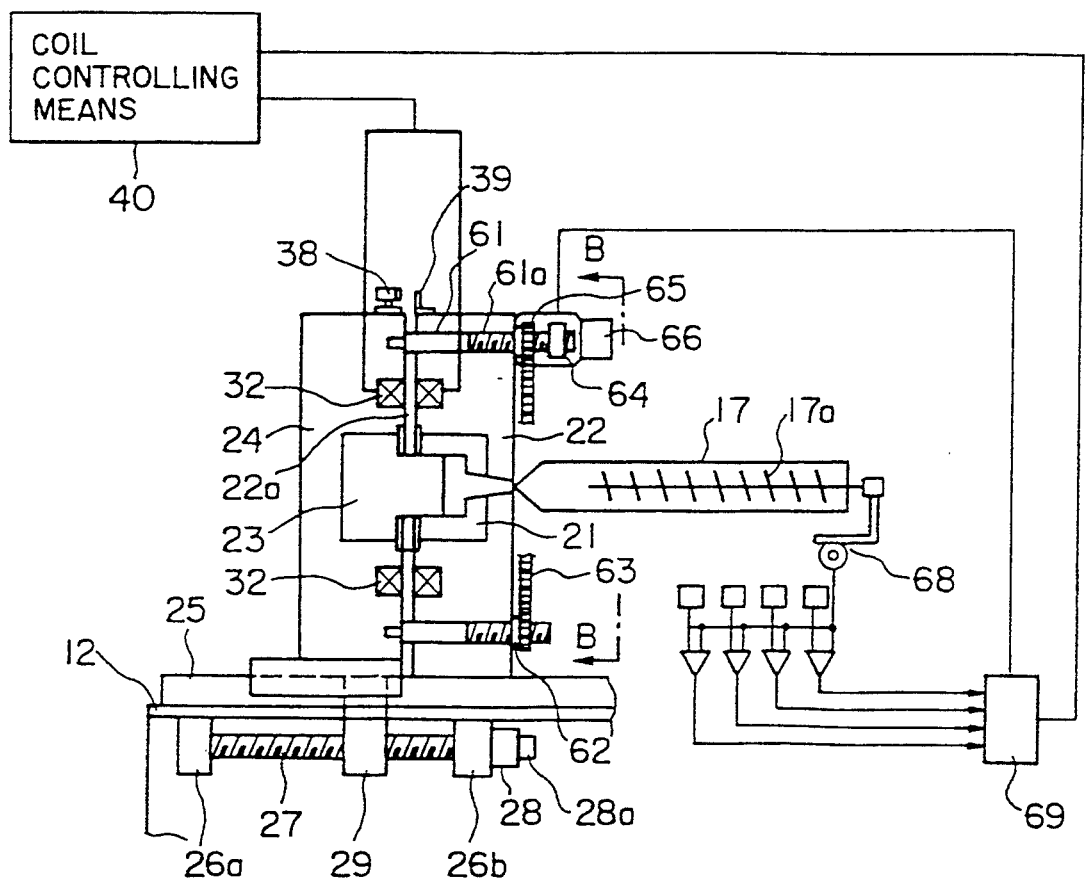
FIG. 10 is a side sectional view illustrating a third embodiment of the invention.
Figure 11:
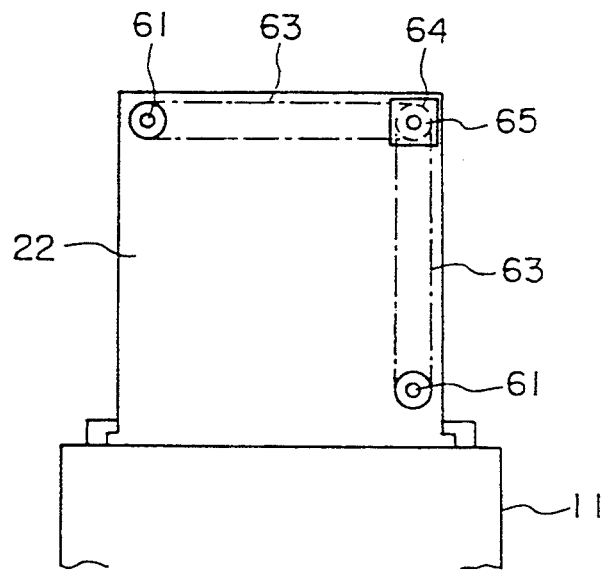
FIG. 11 is a view as perceived in the direction of line B—B in FIG. 10.

FIGS. 10 to 12 show a third embodiment of the present invention.

In this embodiment, striking pins 61 for Use both in an opening operation of the molds and as a positioning guide are mounted on the stationary platen 22.

The striking pins 61 are mounted so as to extend through the stationary platen 22 in symmetrical positions on the diagonal line of the stationary platen 22, as shown in FIGS. 10 and 11. Each of the striking pins 61 is formed at the rear portion with a threaded portion 61a, which projects from the back side of the stationary platen 22 and which is engaged by a nut member 62 having an internal thread in the inner portion and a chain sproket portions on the outer periphery. The striking pin 61 is retained for axial movement and the nut member 62 is retained for rotational movement.

One end of a chain 63 forming a closed loop is mounted on the sproket portion of the nut member 62, while the other end of the chain 63 is mounted on a sproket 65 driven to be rotated by a servo motor 64 which is provided with a position detector 66 for detecting the position of the striking pin 61.

Figure 12A:
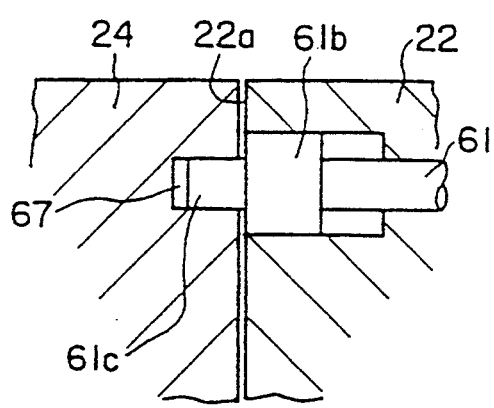
FIGS. 12(A) and (B) are fragmentary enlarged sectional views showing the state where a striking pin is actuated.

Each of the striking pins 61 is formed at the front portion (left of the drawing) with a striking portion 61b having an enlarged diameter and a positioning portion 61c extending forward from the striking portion 61b and having a smaller diameter than that of the striking portion 61b. Guide holes 67 are formed in the positions opposite to the positioning portion 61c of the movable platen 24, and as shown in FIG. 12(A), when the stationary platen 22 and the movable platen 24 are brought in close vicinity to each other for a mold clamping operation, the positioning portions 61c are inserted into the guide holes 67 for alignment of both of the platens 22, 24.

In this embodiment, a position detector 68 is provided for detecting the position of the screw 17a arranged within the barrel and connected through a control means 69 of the servo motor 64 to the electromagnetic coil controlling means 40.

Now, the operation of this embodiment is explained. First, when a mold clamping operation is to be carried out, the striking pins 61 are withdrawn backward (right in the drawing), that is, only the positioning portions 61c project from the opposite surface 22a of the stationary platen 22 (FIG. 12(A)). As stated above, when the movable platen 24 is moved close to the stationary platen 22, the positioning portions 61c are inserted into the guide holes 67 for alignment of both of the molds 21, 23.

The injection molding process is carried out, and subsequently, a command for opening the molds is given to actuate the servo motor 64 which drives to rotate the nut members 62 through the mechanism of the chain 63 and sproket 65. This rotation of the nut members 62 causes the threaded portions 61a of the striking pins 61 to be moved axially, so that the striking pins 61 are moved towards the movable platen 24.

This movement of the striking pins 61 is carried out in synchronization with the axial movement of the nut member 29 and the movable platen 24 due to the rotation of the feeding screw 27.

Figure 12B:
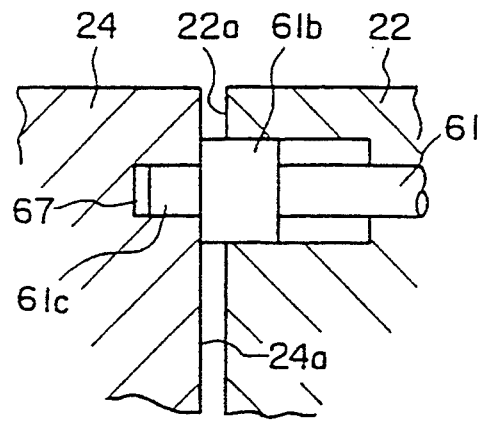

The striking portions 61b of the striking pins 61 are extended from the opposite surface 22a of the stationary platen 22 and apply a biasing force to the movable platen 24 while in an abutting engagement with the opposite surface 24a of the movable platen 24, so that the biasing force is added to the platen feeding force due to the nut member 29, which enables an initial opening force for the opening operation of the molds to be made greater (FIG. 12(B)).

After opening the molds, the movable platen 24 is moved away by the platen feeding means. In this way, the opening operation of the molds can be carried out positively and rapidly.

The mold clamping device according to this embodiment may be applied to a complicated clamping method as stated below.

First, the driving motor 28 is operated to move the movable platen 24 towards the stationary platen 22 by the feeding screw 27, until the movable platen 24 is stopped in a position where a minute gap is produced between the two molds, while detecting the position of the movable platen 24 by the position detector 28a. In this state, the servo motor 64 for driving the striking pins 61 may be operated to extend the front end portions 61b of the striking pins 61 a predetermined distance from the opposite surface of the stationary platen 22, while detecting the position of the striking pin 61 by the position detector 66.

With the state where the movable platen 24 is stopped while being detected by the position detector 28a, a raw molding material is subsequently injected into the molds and after a preset period of time is elapsed from the start of the injecting operation, a predetermined magnetic attracting force is generated to thereby clamp the molds, or when the value of a gap between both of the molds, which is slightly increased when the raw molding material is injected into the molds, reaches a preset value, the molds are clamped.

Furthermore, with the state where the striking pins 61 are projecting, when a current is subsequently supplied to the electromagnetic coils 32, both of the molds are clamped by a magnetic attracting force, however the projection of the front ends 61b of the striking pins 61 prevents the opposite surfaces of both of the molds 21, 23 from being brought into a perfect close contact with each other, thereby causing a minute gap between the opposite surfaces of both of the molds.

In this state, a raw molding material is injected into the molds. Since the volume of the cavity of the molds is made slightly greater than a predetermined volume, a predetermined amount of a raw molding material can be injected with a smaller injecting force.

After completion of the injecting operation, the servo motor 64 is operated again to move back the front ends 61b of the striking pins 61. In synchronization with this backward movement of the striking pins 61, the feeding screw 27 is rotated to thereby move the nut member 29. At the same time, a current supplied to the electromagnetic coil 32 is increased based on a signal from a screw position detector 68 to thereby clamp both of the molds under a higher pressure.

This mold clamping method permits finally molded products having higher accuracy in size and higher density to be obtained. Besides, since a minute gap is formed at the time of injection, the gas existing within the molten resin may be vented. Furthermore, since the pressure of injection (filling pressure of injection) can be kept lower, the method provides a superior effect that stress is difficult to produce.

The control of a gap between both of the molds can be carried out in an effective and higher accurate manner using the gap sensor 38 and the position detector 66.

Figure 13:
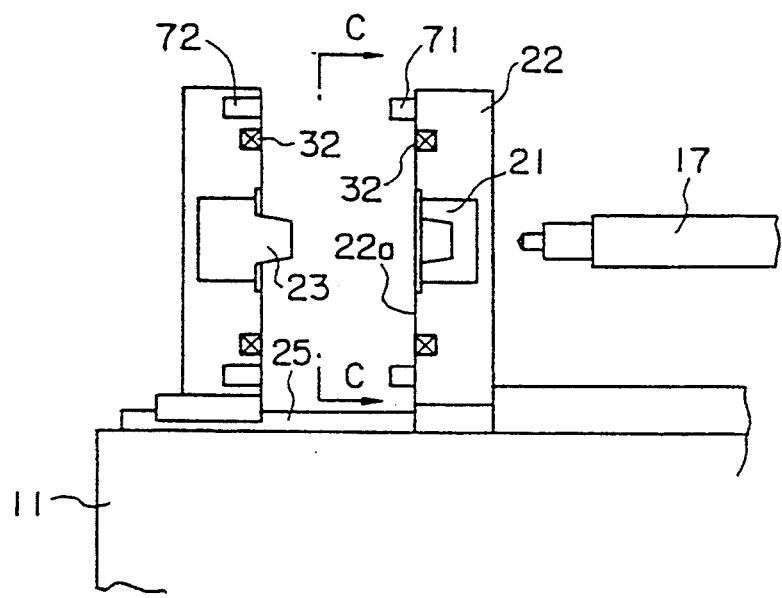
FIG. 13 is a side sectional view illustrating a forth embodiment of the invention.
Figure 14:
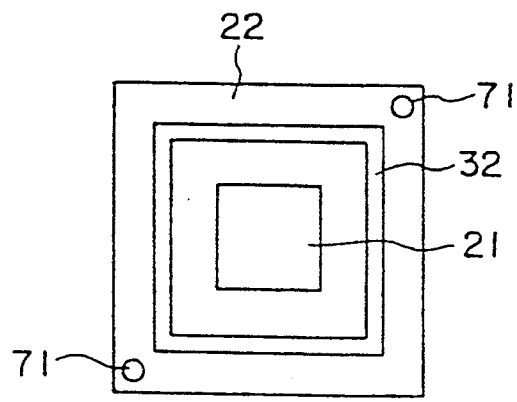
FIG. 14 is a view as perceived in the direction of line C—C in FIG. 13.

FIGS. 13 and 14 illustrate a fourth embodiment of the invention.

In this embodiment, guide pins for alignment are provided in place of the striking pins in the third embodiment as stated above.

The guide pins 71 are provided on the opposite surface 22a of the stationary platen 22 so as to extend towards the movable platen 24. Preferably, the guide pins are arranged symmetrically on the diagonal line in the positions outside the electromagnetic coil 32, as shown in FIG. 14.

Guide holes 72 in which the guide pins 71 are inserted are provided in the opposite surface 24a of the movable platen 24 in the positions opposite to the guide pins 71.

In the present embodiment, when carrying out a mold clamping operation, the guide pins 71 are inserted into the guide holes 72 and the alignment of both of the platens 22, 24 is made positively, so that the accuracy in alignment of both of the molds 21, 23 can be enhanced.

Figure 15:
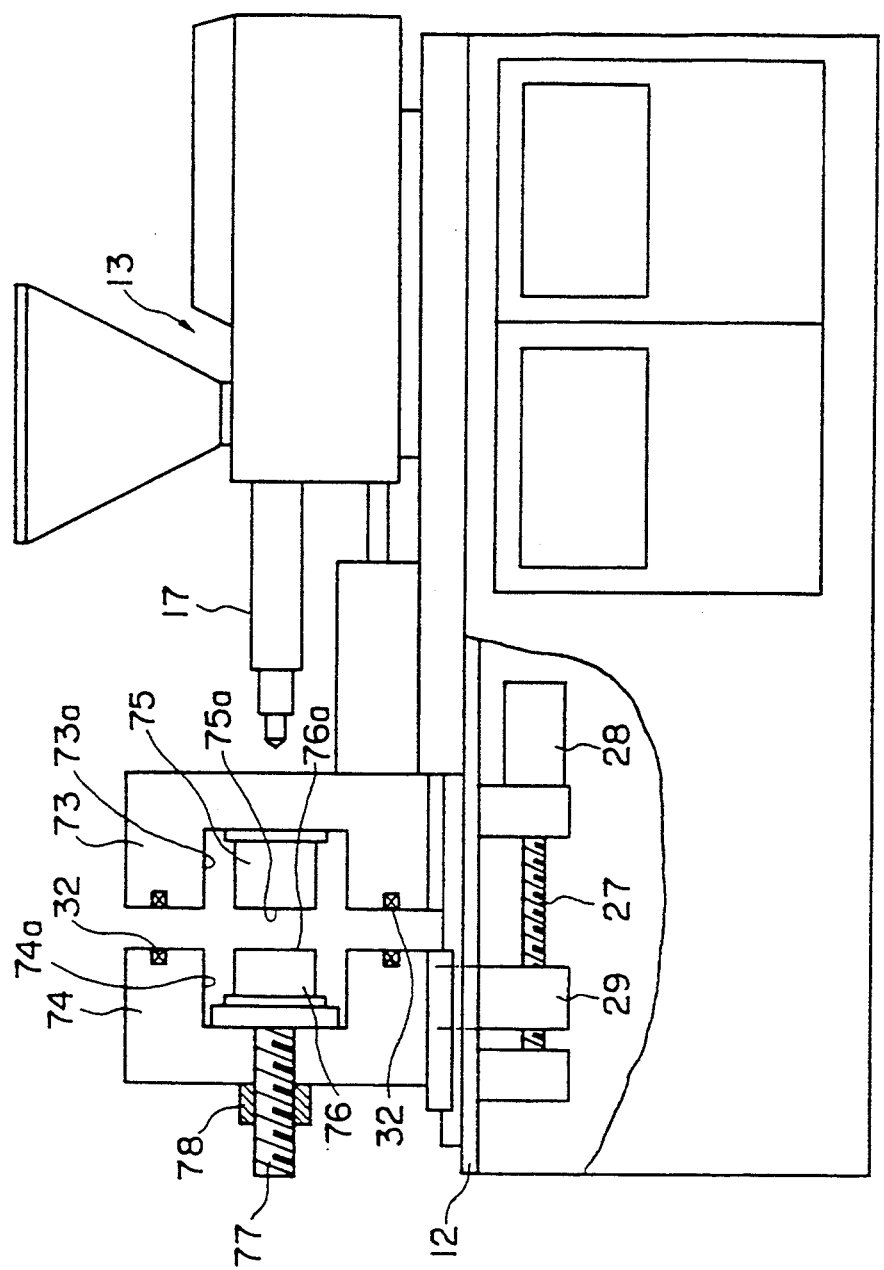
FIG. 15 is a side sectional view showing a fifth embodiment of the invention.

FIG. 15 shows a fifth embodiment of the invention.

In a mold clamping device of this embodiment, both of the platens are modified so that conventional molds may be used in place of the cassette type molds as stated above. That is, the stationary and movable platens 73 and 74 are formed in the center thereof with recesses 73a, 74a, in which a first and second molds 76 are mounted.

These both molds 75, 76 are constituted so that the distances of the mounting positions on the platens to the abutting surfaces 75a, 75a of the molds may be adjusted so as to be capable of using the various forms of molds if modified. In this embodiment, a screw member 77 is connected to the back of the second mold 76 and extends axially through the movable platen 74, and a nut member 78 is threadably engaged with the screw member 77. The adjustment of the engaging position of the nut member 78 enables the second mold 76 to be axially moved, so that the adjustment in thickness of the molds may be carried out.

The electromagnetic coil 32 is provided in the vicinity of the peripheral edge of both of the platens 73, 74 at which they can come close with each other.

In this embodiment, since the recesses 73a, 74a for mounting the molds are provided at the center portions of both of the platens, the conventional molds in the various forms can be exchanged and mounted therein. The axially movable second mold 76 enables the position of the mold to be freely adjusted even if the thickness of the mold is varied.

Figure 16:
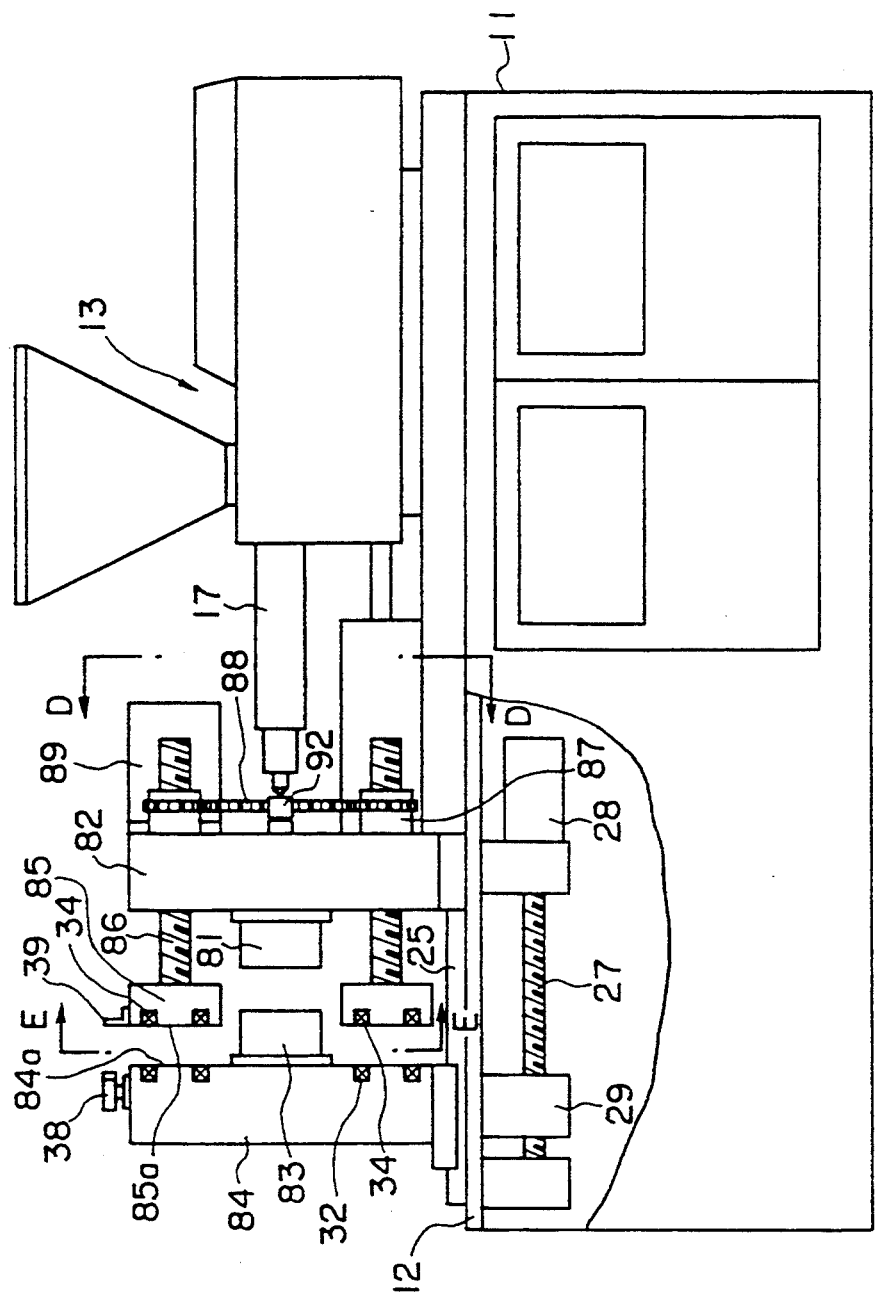
FIG. 16 is a side sectional view showing a sixth embodiment of the invention.
Figure 17:
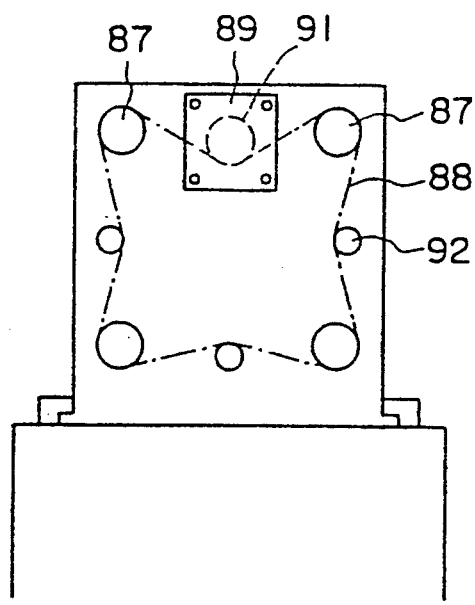
FIG. 17 is a view as perceived in the direction of line D—D in FIG. 16.
Figure 18:
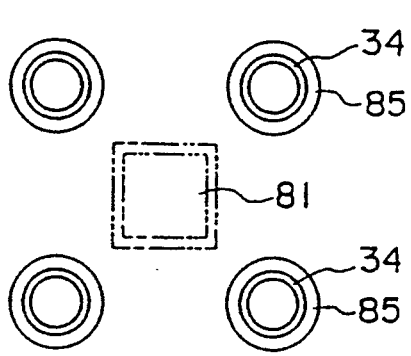
FIGS. 18(A) to (C) are views as perceived in the direction of line E—E in FIG. 16 and schematic views showing various forms of an adjusting member.
Figure 18:
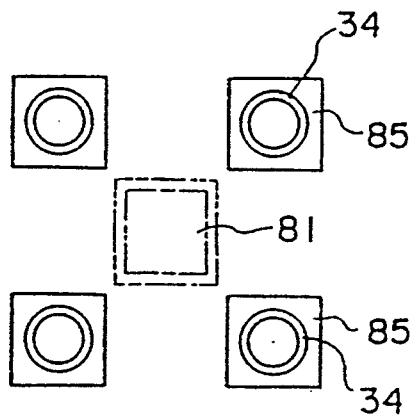
Figure 18:
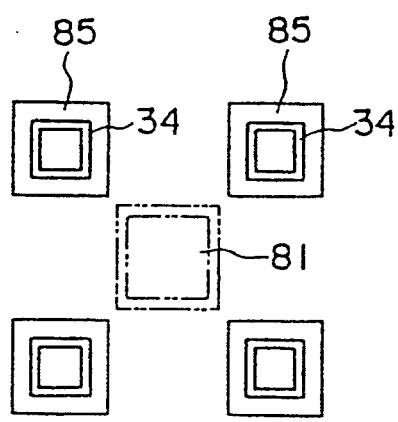

FIGS. 16 to 18 illustrate a sixth embodiment of the invention.

In this embodiment, the electromagnetic coil is movably mounted with respect to the platen in the same direction as that of the guide bars 25.

The stationary platen 82 having the first mold 81 therein and the movable platen 84 having the second mold 83 therein are mounted on the table 12 of the machine frame 11, and the movable platen 84 is slidable on the guide bars 25.

Referring to FIG. 16, a reference numeral 85 indicates adjusting members in the form of disc, which are directed towards the opposite surface 84a of the movable platen 84 and a plurality of, for example four electromagnetic coils are arranged in the periphery of the mold 81 at a distance from each other, as shown in FIG. 18(A). Each of the electromagnetic coils 34 is attached to the surface 85a of the adjusting member 85 opposite to the movable platen 84. Similarly, a plurality of the electromagnetic coils 34 are provided in the opposite surface of the movable platen 84.

The adjusting members 85 may be of any forms other than a circular disc, for example a square, as shown in FIGS. (B) and (C). In addition, the electromagnetic coils 34 may be mounted on the adjusting members 85 in an arrangement in the form of circle or square.

A screw member 86 is connected to the back side of each of the adjusting members 85 and extends through the stationary platen 82 parallel to the guide bars 25 and is supported thereon for axial movement. An adjusting member 87 is threadably engaged with each of the screw members 86 extending through the stationary platen 82 and projecting out of the back side thereof (the side of the injection device 13).

Each of the adjusting members 87 is formed in the periphery thereof with a sprocket portion, on which a chain 8 forming a closed loop is mounted, as shown in FIG. 17. The chain 88 is engaged halfway by a sprocket 91 which is driven to be rotated by a driving motor 89 mounted on the stationary platen 82, so that a torque of the driving motor 89 is transmitted to the adjusting members 87 through the chain 88. In FIGS. 16 and 17, a reference numeral 92 designates an intermediate sprocket for preventing a slack of the chain 88.

In this embodiment, the operation of the driving motor 89 causes the adjusting nut members 87 to be rotated, to thereby move the screw members 86 axially. This enables the positions of the adjusting members 85 to be adjusted, thus permitting to comply with any change in thickness of the molds 81, 82 and also to use the conventional molds.

Moreover, if the gap sensor 38 is provided corresponding to each of the adjusting members 85, the control of the value of the current supplied to each of the electromagnetic coils 34 enables the gaps between the movable platen 84 and the adjusting members 85 to be adjusted at every adjusting members. This permits the uniform mold clamping of the molds.

Figure 19:
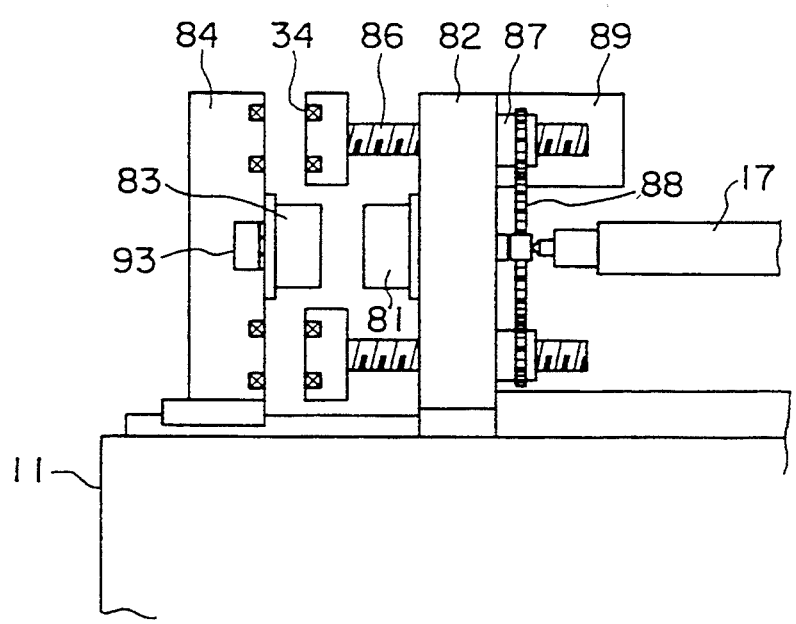
FIG. 19 is a side sectional view illustrating a modified example of the embodiment shown in FIG. 16.

FIG. 19 shows a modification of the embodiment shown in FIG. 16.

In this embodiment, a load measuring means such as a load cell 93 is provided within the movable platen 84 as a means for measuring a clamping force of the molds.

After completion of the mold clamping operation, the mold clamping force is measured, and if it is insufficient, the value of the current supplied to the electromagnetic coils 34 is increased to thereby provide a predetermined mold clamping force.

Figure 20:
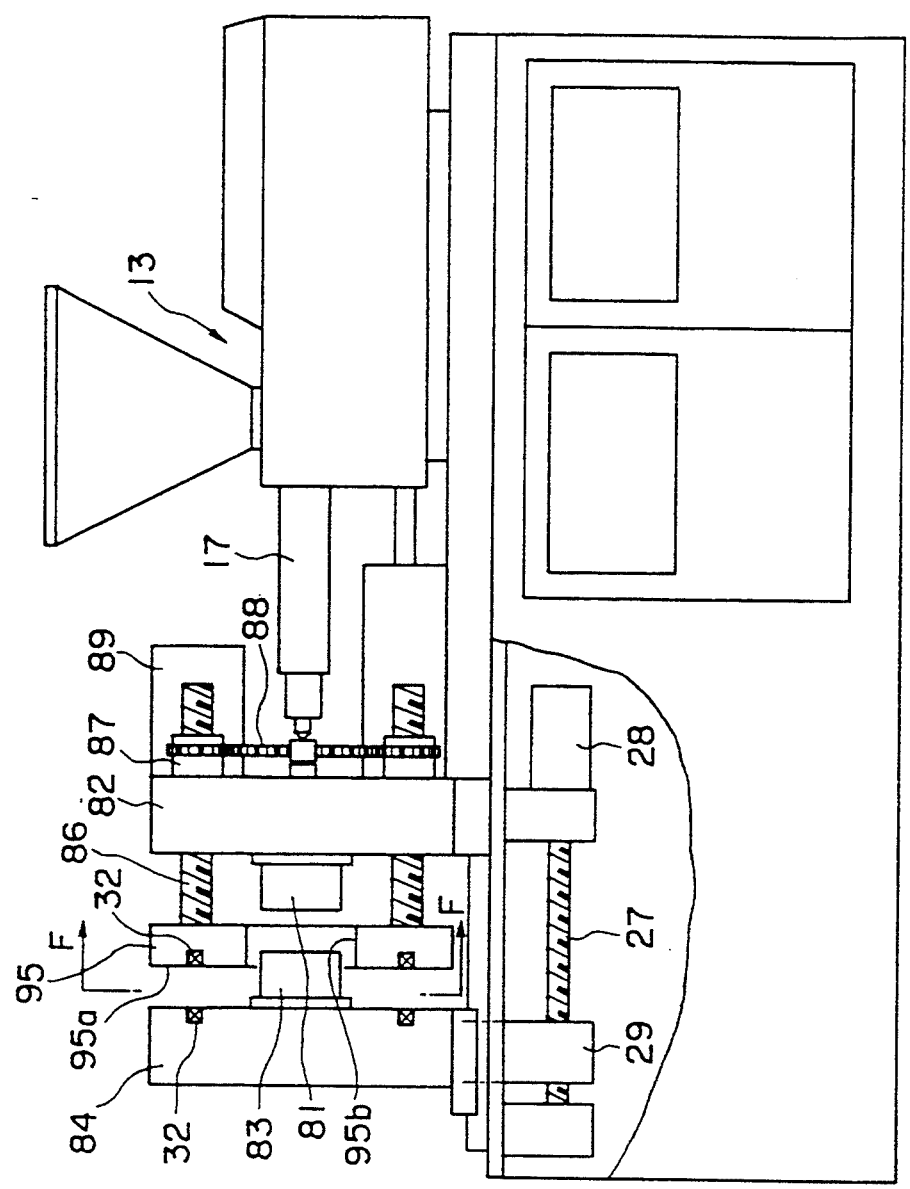
FIG. 20 is a side sectional view showing a modified example of the embodiment of the invention.

FIGS. 20 and 21 illustrate a modification of the sixth embodiment of the invention shown in FIG. 16.

In this embodiment, the adjusting member 95 is comprised of a single adjusting plate. The adjusting member 95 is formed at its center with a through hole 95b through which the mold 83 can be passed. The adjusting member 95 is in the form of circle or square as shown in FIGS. 21(A) and (B), and the electromagnetic coil 32 is mounted in the opposite surface 95a to the movable platen 84 so as to enclose entirely the periphery of the mold 83. In place of one electromagnetic coil 32, two and more ones may be arranged in a dispersed relation as stated with reference to FIG. 3.

The adjusting member 95 is supported by the screw members 86 provided passing through the stationary platen 82, and the screw members 86 are threadably engaged by the adjusting nut members 87 driven by the driving motor 89. The position of the adjusting member 95 can be adjusted axially by operating the driving motor 89 similarly to the aforementioned embodiment.

FIG. 22 shows a seventh embodiment of the invention.

In this embodiment, the platens are integrally formed with the molds. Referring to the drawing, reference numerals 102, 104 indicate the stationary and movable molds provided with a concave portion 101 and a convex portion 103 for forming in combination a cavity in which a molten resin is injected.

The stationary mold 102 is placed on and secured to a stationary block 102b fixed to the table 12 at the side of the injection device 13, by means of bolts 99, and the movable mold 104 is placed on and secured to the movable block 104b slidably mounted on the guide bars 25, by means of bolts 99. The electromagnetic coils 32 are arranged on the respective opposite surfaces 102a, 104a of the stationary and movable molds 102, 104 so as to enclose the concave and convex portions 101 and 103 at the center of the molds.

Guide pins 71 are provided on the opposite surface 102a of the stationary mold 102 so as to project towards the movable mold 104, and guide holes 72, in which the guide pins 71 are inserted, are provided in the corresponding positions on the opposite surface 104a of the movable platen 104.

The operation of the mold clamping device according to this embodiment is similar to that of the aforementioned embodiment.

Figure 23:
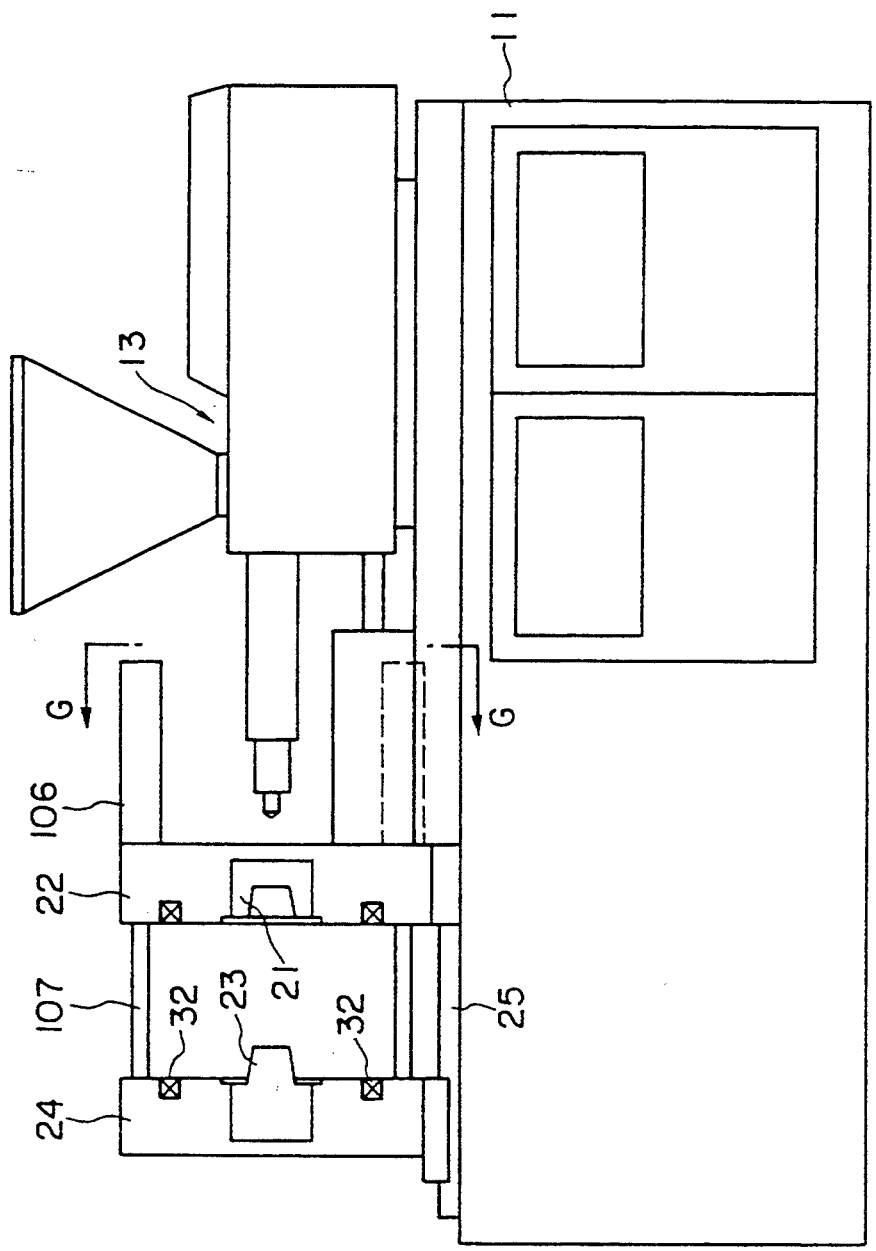
FIG. 23 is a side sectional view illustrating a eighth embodiment of the invention.

FIGS. 23 and 24 illustrate an eighth embodiment of the present invention. In the present embodiment, a direct-acting cylinder device is used as a platen feeding means.

The direct-acting cylinder 106 is fixedly secured to the back side of the stationary platen 22, and the rod 107 thereof extends through the stationary platen 22 up to the movable platen 24 and is connected thereto, as shown in FIG. 24.

Preferably, the direct-acting cylinder 106 is arranged on the back side of the stationary platen 22 on the diagonal line.

In this embodiment, the movable platen 24 can be slidably moved on the guide bars 25 by the extension and contraction of the rod 107 of the direct-cylinder 106. For the direct-acting cylinder, a hydraulic cylinder or an electric motor cylinder may be used, and the hydraulic cylinder, if supplied with oil under high pressure, can produce a greater mold clamping force, so that it can carry out a strong mold clamping operation in combination with a magnetic attracting force due to the electromagnetic coils 32.

FIG. 25 shows an embodiment in which a current control inverter 111 is used as an electromagnetic coil controlling means 110. That is, the alternating current power source 41 is connected to a single phase current variable type current controlling inverter 111, and the alternating current supplied to the current controlling inverter 111 is converted to the direct current of a predetermined value on the basis of a signal of the exciting current converting command, and is supplied to the electromagnetic coils In carrying out a mold opening operation, the respective electromagnetic coils 32 are supplied from the current controlling inverter 111 with a demagnetizing current sufficient to extinguish a residual magnetic attracting force based on a signal of demagnetizing current command.

In each of the embodiments as aforementioned, the first platen is stationary and the second platen is movable, however it is possible to move both of the platens towards and away from each other.

INDUSTRIAL APPLICABILITY

As explained above, the present invention permits the clamping operation of the metal molds to be carried out utilizing a magnetic attracting force of the electromagnetic coil without any conventional mold clamping mechanisms using conventional hydraulic devices.

This permits the tie bars for connecting the platens to be removed, so that the construction of the mold clamping device can be facilitated and an exchanging operation of the molds can be made easily.

Furthermore, since the device according to the invention does not require any hydraulic acting mechanisms for the mold clamping operation, the longitudinal dimension of the injection molding machine can be shortened. In addition, the removal of the hydraulic driving system enables the maintenance and control of the device to be facilitated.

Moreover, the control of a mold clamping force, the control of the mold clamping positions and the like can be made easily, and therefore an usually uniform and optimum mold clamping operation can be performed.

The present invention, if applied to the clamping devices for the molds in an injection molding machine, a die casting machine and the like, provides particularly advantageous effects.

We claim:

1. A method for clamping a pair of molds in an injection molding machine, which comprises the steps of:
   (a) providing a magnetic attracting force generating means in at least one of first and second platens, said first platen having a first mold retained therein and said second platen having a second mold retained therein;
   (b) moving both of the plates relatively towards each other to thereby close the first and second molds;
   (c) generating a magnetic attracting force between the first and second platens by the magnetic attracting force generating means to retain both of the platens in a close condition and produce a predetermined mold clamping force between both of the molds;
   (d) pouring a raw molding material into the cavity within said molds;
   (e) releasing the magnetic attracting force between both of the platens; and
   (f) moving both of the platens relatively away from each other to open the first and second molds;
   wherein said method further includes detecting the amount of a gap between the first and second platens, and controlling the amount of the gap to thereby control the mold clamping force between both of the molds.

2. A method for clamping the molds as claimed in claim 1, wherein said step (c) comprises detecting a value of current supplied to the magnetic attracting force generating means, and controlling said value of current to thereby achieve said predetermined mold clamping force between both of the molds.

3. A method for clamping the molds as claimed in claim 1, wherein said magnetic attracting force means comprises a plurality of magnetic attracting force elements, said step (a) comprises arranging said magnetic attracting force generating elements in said at least one of the first and second platens in a plurality of dispersed positions, and said step (c) comprises adjusting values of the current supplied to the respective magnetic attracting force generating elements to thereby control the clamping force between both of the molds to become uniform.

4. A method for clamping the molds as claimed in claim 3, further comprising arranging a plurality of detecting means for detecting the gaps between the opposite surfaces of the first and second platens, wherein said step (c) further comprises controlling the values of the current supplied to said magnetic attracting force generating elements so that values of gaps detected by the plurality of gap detecting means agree with each other or deviations thereof are lower than a preset value.

5. A method for clamping the molds as claimed in claim 1, wherein said step (b) provides a clamping force below a middle pressure between both of the molds, and said step (e) causes both of the molds to be slightly moved away from each other to thereby produce a distance between the abutting surfaces thereof and further includes increasing the value of the current supplied to the magnetic attracting force generating means to thereby produce a clamping force under a high pressure between both of the molds.

6. A method for clamping the molds as claimed in claim 1, wherein said method further comprises:
    placing a predetermined size of a gap member between both of the platens to cause a minute gap between the abutting surfaces of both of the molds to be produced, and closing both of the molds;
    removing said gap member from between both of the platens; and
    increasing the current supplied to the magnetic attracting force generating means to thereby produce a mold clamping force under a high pressure between both of the molds.

7. A method for clamping the molds as claimed in claim 1, wherein said step (b) includes stopping both of the platens in a position where a minute gap is produced between the abutting surfaces of both of the molds, and said step (c) is performed when the minute gap between the abutting surfaces of both of the molds increases to a preset value 8. A method for clamping a pair of molds, which comprises the steps of:
    (a) moving two platens relatively towards each other;
    (b) stopping both of the platens in a position where a minute gap is produced between abutting surfaces of both of the molds;
    (c) pouring a raw molding material into the molds;
    (d) after a preset time period has elapsed from initiation of said step (c), producing a magnetic attracting force between both of the platens by magnetic attracting force generating means to thereby produce a predetermined mold clamping force between the two molds.

9. A mold clamping device in an infection molding machine, comprising:
    a first platen for retaining a first mold therein and a second platen for retaining a second mold therein, said first and second platens being arranged on a table on which an injection device is mounted;
    a platen feeding means for moving said first and second platens relative to each other on said table;
    a magnetic attracting force generating means, comprising an electromagnetic coil, arranged in at least one of said first and second platens, said electromagnetic coil being arranged so as to enclose the periphery of at least one of the first and second molds; and
    a magnetic attracting force controlling means for controlling the magnetic attracting force of said magnetic attracting force generating means;
    wherein a groove member comprising magnetic material having a great maximum magnetic flux is embedded in at least one of the first platen and second platen, the opening side of said groove member being directed towards the surface of the opposing platen, and said electromagnetic coil is arranged within said groove member.

10. A mold clamping device in an infection molding machine, comprising:
    a first platen for retaining a first mold therein and a second platen for retaining a second mold therein, said first and second platens being arranged on a table on which an injection device is mounted;
    a platen feeding means for moving said first and second platens relative to each other on said table;
    a magnetic attracting force generating means, comprising an electromagnetic coil, arranged in at least one of said first and second platens, said electromagnetic coil being arranged so as to enclose the periphery of at least one of the first and second molds;
    a magnetic attracting force controlling means for controlling the magnetic attracting force of said magnetic attracting force generating means; and
    guide means, provided on said table, for slidably moving at least one of said first and second platens;
    wherein said electromagnetic coil is attached to an adjusting member mounted on one of the first platen and second platen for movement in the same direction as that of the guide means.

11. A mold clamping device as claimed in claim 10, wherein said adjusting member comprises a plurality of adjusting plates, and electromagnetic coils are arranged at the front ends of the respective adjusting plates.

12. A mold clamping device as claimed in claim 10, wherein said adjusting member comprises a single adjusting plate formed at the center thereof with a through hole dimensioned to receive at least one of said first and second molds.

13. A mold clamping device as claimed in claim 10, wherein an adjusting member driving means for moving axially the adjusting member is mounted on said adjusting member.

14. A mold clamping device as claimed in claim 13, wherein said adjusting member driving means comprises screw members, each connected at one end thereof to the adjusting member and rotatably supported on said one of first platen and second platen, and adjusting nut members provided at the back side of said one of the first platen and the second platen and threadably engaged with said screw members.

15. A mold clamping device in an injection molding machine, comprising:
    a first platen for retaining a first mold therein and a second platen for retaining a second mold therein, said first and second platens being arranged on a table on which an injection device is mounted;

a platen feeding means for moving said first and second platens relative to each other on said table;

a magnetic attracting force generating means arranged in at least one of said first and second platens; and a magnetic attracting force controlling means for controlling the magnetic attracting force of said magnetic attracting force generating means;

wherein striking pins, which are movable forward and backward with respect to the opposite surface of one of the first and the second platen, are mounted on any one of the first and second platens for biasing against one of said first platen and second platen to open said mold clamping device, each of said striking pins having a front portion having a first diameter and a middle portion having a second diameter, said second diameter being greater than said first diameter.

16. A mold clamping device as claimed in claim 15, wherein said striking pins are each formed at the rear portion thereof with a threaded portion, and said threaded portion is threadably engaged with a nut member provided at the back side of said one of the first platen and the second platen, and a means for rotatably driving the nut member is connected to the nut member.

17. A mold clamping device as claimed in claim 16, further comprising a position detecting means for detecting the positions of the striking pins; a gap detecting means for detecting a gap between the opposite surfaces of the first and second platens; and a position detecting means for detecting relatively moved positions of both of the platens.

* * * * *